United States Patent [19]

Higgins

[11] Patent Number: 5,321,905
[45] Date of Patent: Jun. 21, 1994

[54] DEVICE FOR ANIMATING A FISHING LURE

[76] Inventor: John M. Higgins, 75-6002 Alii Dr., #3101, Kailua Kona, Hi. 96740

[21] Appl. No.: 97,125

[22] Filed: Jul. 26, 1993

[51] Int. Cl.⁵ .......................................... A01K 85/00
[52] U.S. Cl. .................................. 43/42.03; 43/42.14; 43/42.15; 43/42.19
[58] Field of Search ................. 43/42.03, 42.11, 42.13, 43/42.14, 42.15, 42.16, 42.18, 42.19, 42.36, 42.51, 42.46, 42.17

[56] References Cited

U.S. PATENT DOCUMENTS

| | | | |
|---|---|---|---|
| 1,154,168 | 9/1915 | Bosserman | 43/42.36 |
| 1,620,972 | 3/1927 | Hobbs | 43/42.51 |
| 1,666,072 | 4/1928 | Schilpp | 43/42.17 |
| 2,429,568 | 10/1947 | Stevermer | 43/42.17 |
| 2,523,536 | 9/1950 | Maddux | 43/42.03 |
| 2,708,805 | 5/1955 | Garvie | 43/42.15 |
| 2,926,451 | 3/1960 | Leba | 43/42.14 |
| 3,457,667 | 7/1969 | Tripp | 43/42.02 |
| 4,035,945 | 7/1977 | Newman | 43/42.15 |
| 4,135,323 | 1/1979 | Esten | 43/42.14 |
| 4,501,087 | 2/1985 | Blomquist | 43/42.51 |
| 4,819,362 | 4/1989 | Lewis | 43/42.2 |
| 5,167,088 | 12/1992 | Wardall | 43/42.03 |

Primary Examiner—P. Austin Bradley
Assistant Examiner—James Miner
Attorney, Agent, or Firm—John R. Flanagan

[57] ABSTRACT

A device for animating a fishing lure comprising a section of wire which carries a pair of saucer-shaped disks constrained by a plurality of beads attached on the section of wire. Each of the disks has a mounting hole receiving the section of wire and a plurality of apertures spaced circumferentially and radially about the hole to permit water to flow through and between the disks as they are pulled through the water. The disks are rotatably mounted on the section of wire such that their respective apertures are capable of intermittent alignment which allows the device to rest in a stable mode between random, angular oscillations. The random, angular oscillations produced by the device will animate a fishing lure in a manner which simulates the movements of a water creature.

20 Claims, 1 Drawing Sheet

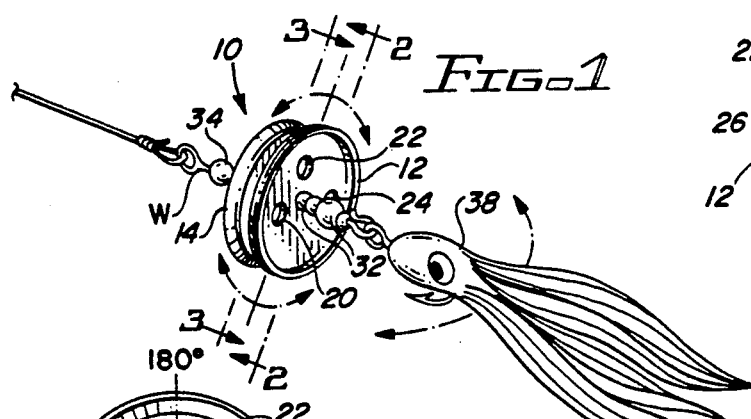
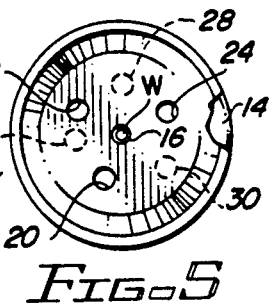
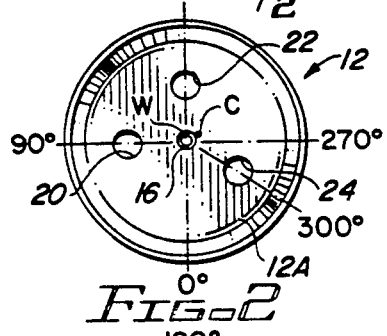
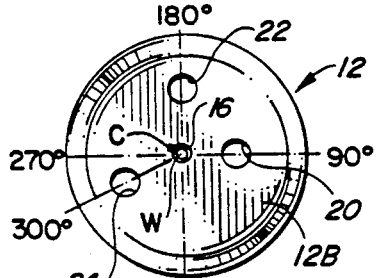
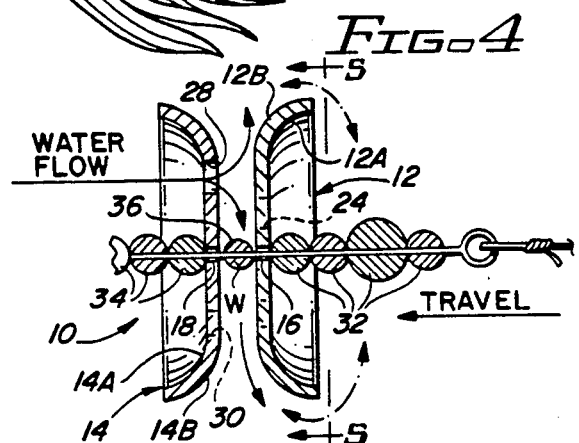
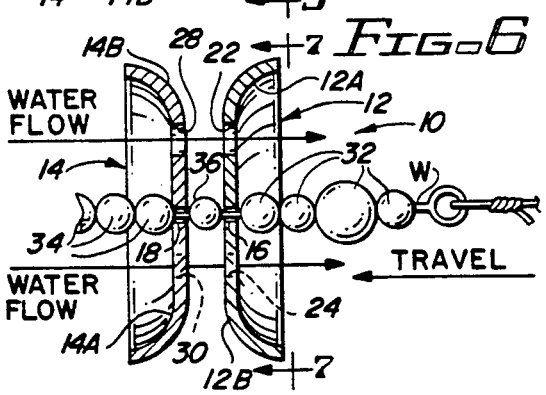
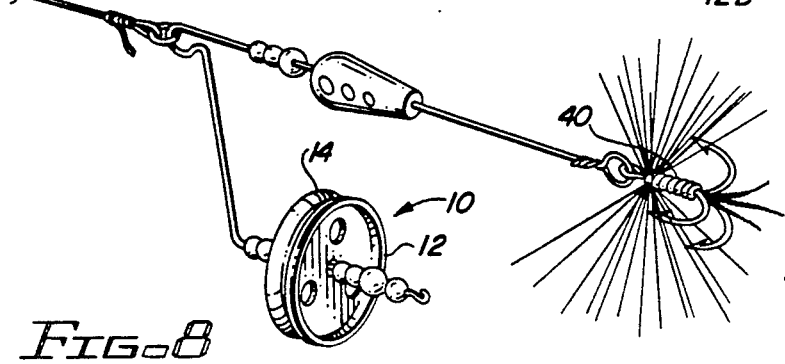
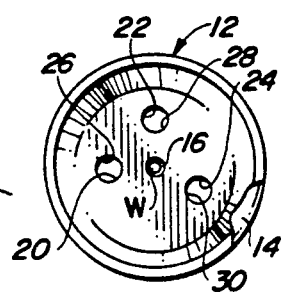

DEVICE FOR ANIMATING A FISHING LURE

BACKGROUND OF THE INVENTION

1. Field of the Invention

The present invention generally relates to fishing lures, and more particularly to devices that animate fishing lures to simulate the motions of various creatures prayed on by game fish.

2. Descriptions of the Prior Art

It has long been known by experienced freshwater sport fisherman that devices that animate fishing lures attract fish. Armed with this knowledge, sport fishing equipment suppliers have designed various devices for animating fishing lures as they are pulled through the water. Two recent examples of animators are found in U.S. Pat. No. 4,819,362 issued to Lewis and U.S. Pat. No. 5,167,088 issued to Wardell. Lewis discloses a pair of symmetrical blades which have angled flanges that are designed to cause the blades to rotate and swivel as the blades are pulled through water. Wardell discloses a substantially flat circular disk having a radial crease and a central orifice. Wardell's disk is carried by a fishing line or wire substantially normal to the line or wire as it is pulled through the water. The crease in Wardell's disk causes the disk to vibrate or oscillate in a regular fashion as it travels through the water. The fishing lure animating devices of the Lewis and Wardell patents animate a fishing lure in a way typical of prior art fishing lure animating devices in that they produce regular movements.

However, the purpose of using a fishing lure animating device is to cause a fishing lure to simulate the movements of a water creature, and more ideally, a distressed or injured water creature. Water creatures generally, and distressed or injured water creatures in particular do not exhibit regular movements. Typically, they tend to oscillate randomly between rest and motion. Many small water creatures, in fact, tend to move through the water by bursts of propulsive motion followed by a gliding action. Therefore, fisherman are more likely to benefit from a lure animator which produced random, irregular or intermittent motions as opposed to regular motions.

Consequently, a need exists for a fishing lure animator which will cause a fishing lure to move in a random and intermittent manner which would more closely simulate actual water creature movements and thus be more likely to fool game fish into pursuing such lore.

SUMMARY OF THE INVENTION

The present invention provides an improved device for animating a fishing lure designed to satisfy the aforementioned need. The fishing lure animating device of the present invention utilizes a pair of concave disks having slightly offset central holes for receiving a fishing line or section of wire. The concave disks are mounted back to back and each has an arrangement of apertures defined therein being spaced circumferentially from one another about and radially from the offset central hole of the disk. The apertures of one disk are defined in a pattern that matches the other disk but are deliberately uneven and unbalanced in order to produce unbalanced forces that cause the disk to wobble when water passes through the apertures. The patterns are such that there is only one relative position between the disks will allow all of the apertures in one disk to align with all apertures in the other disk. As such, the disks combined have the capability for generating motions which randomly fluctuate between stable and unstable states. These random fluctuations of movement attract game fish because they simulate the actual and expected movements of injured or distressed water creatures.

Accordingly, the present invention is directed to a device for animating a fishing lure comprising: (a) an elongated section of wire; and (b) a pair of disks disposed on the section of wire. Each of the disks has a pair of oppositely-facing surfaces of respective concave and convex shapes. The disks are disposed back to back at their respective convex surfaces. Each disk has a mounting hole substantially centrally-located for slidably receiving the section of wire and a plurality of apertures being spaced circumferentially from one another about and radially from the mounting hole of the disk. Preferably the mounting hole is slightly offset or off-center from the true center of the disk.

The animating device also includes retaining means in the form of at least a pair of beads mounted on the wire for preventing the disks from being displaced from one another more than a preset distance along the section of wire. Also, each of the disks is rotatably mounted on the section of wire such that the respective apertures of the disks are capable of intermittent alignment in one angular position which allows the device to rest in a stable mode between random, angular oscillations caused by misalignment of the respective apertures of the disks with one another.

These and other features and advantages of the present invention will become apparent to those skilled in the art upon a reading of the following detailed description when taken in conjunction with the drawings wherein there is shown and described and illustrative embodiment of the invention.

BRIEF DESCRIPTION OF THE DRAWINGS

In the following detailed description, reference will be made to the attached drawings in which:

FIG. 1 is a perspective view of the fishing lure animating device shown mounted on a fishing line in series with a fishing lure.

FIG. 2 is an end elevational view of the concave surface of one of the disks of the animating device as seen along line 2—2 of FIG. 1.

FIG. 3 is an end elevational view of the convex surface of one of the disks of the animating device as seen along line 3—3 of FIG. 1.

FIG. 4 is a diametrical sectional view of the animating device showing the apertures of the disks in an unaligned position.

FIG. 5 is an end elevational view of the animating device as seen along line 5—5 of FIG. 4.

FIG. 6 is another diametrical sectional view of the animating device similar to that of FIG. 4 but showing the apertures of the disks in an aligned position.

FIG. 7 is an end elevational view of the animating device as seen along line 7—7 of FIG. 6.

FIG. 8 is a perspective view of the fishing lure animating device shown mounted on a fishing line in parallel with a fishing lure.

DETAILED DESCRIPTION OF THE INVENTION

Referring to the drawings and particularly to FIG. 1, there is illustrated a fishing lure animating device, generally designated 10, of the present invention hereinafter referred to as the animator. The animator 10 is shown rotatably and slidably mounted on a section of wire W.

Referring to FIGS. 1-4 and 6, the animator 10 basically includes the elongated length or section of wire W and a pair of first and second saucer-shaped disks 12, 14 mounted thereon in back to back relationship to one another. Each disk 12, 14 has a mounting hole 16, 18 substantially centrally located for receiving the section of wire W. Preferably, the mounting hole 16, 18 of each disk 12, 14 is slightly offset or off-center from the true center C of the disk, thereby creating an imbalance.

Further, referring to FIGS. 1-7, each disk 12, 14 has a plurality, for example three, apertures 20, 22, 24 and 26, 28, 30 being spaced circumferentially from one another about and radially from the mounting hole 16, 18 of the disk 12, 14. The apertures 20, 22, 24 and 26, 28, 30 in the respective disks 12, 14 are spaced at equal radial distances from the center of the disk. However, the apertures 20, 22, 24 and 26, 28, 30 in the respective disks 12, 14 are not spaced evenly in their angular positions around the centers of the disks. In other words, the apertures in each disk are spaced circumferentially about the mounting hole therein at unequal distances from each other. In the preferred embodiment, the three apertures 20, 22, 24 and 26, 28, 30 are positioned respectively at 90°, 180° and 300° with respect to a 0° reference radial line extending from the center of the respective disks 12, 14. Because of the non-repetitive nature of the positioning of the apertures on each disk, when the disks 12, 14 are placed back to back it is possible to align the apertures 20, 22, 24 on the first disk 12 with the apertures 26, 28, 30 on the second disk 14 in only one position of the disk 12, 14 relative to one another. The one aligned position of the respective pluralities of apertures 20, 22, 24 and 26, 28, 30 of the disks 12, 14 is shown in FIG. 7. In all other positions of the disks 12, 14, a representative example of which is shown in FIG. 5, the respective pluralities of apertures 20, 22, 24 and 26, 28, 30 of the disks 12, 14 are misaligned with one another.

Preferably, the mounting hole 16, 18 of the disks 12, 14 is substantially larger in diameter than the section of wire W so as to provide a loose-fit mounting relationship of the respective disk 12, 14 on the section of wire W. Thus, the disks 12, 14 are slidably and rotatably mounted on the section of wire W such that the respective apertures 20, 22, 24 and 26, 28, 30 of the disks 12, 14 are capable of intermittent alignment in the one angular position which allows the disks 12, 14 to rest in a stable mode between random, angular oscillations caused by misalignment of the respective apertures 20, 22, 24 and 26, 28, 30 of the disks 12, 14 with one another.

As seen in FIGS. 1, 4 and 6, each of the disks 12, 14 preferably has a pair of oppositely-facing surfaces 12A, 12B and 14A, 14B of respective concave and convex shapes. The disks 12, 14 are disposed on the section of wire W such that their respective convex surfaces 12B, 14B are disposed in the back-to-back relationship.

Referring to FIGS. 4 and 6, the animator 10 also includes retaining means in the form of at least a pair of beads and preferably pluralities of beads 32, 34 attached on the wire W at opposite sides of the pair of disks 12, 14. The beads 32, 34 are provided to prevent the disks 12, 14 from being displaced from one another no more than a preset distance along the section of wire W in order to limit the maximum spacing between the disks 12, 14 and thus maintain the disks in a desired close proximity to one another. The retaining means can also include at least one bead 36 disposed on the section of wire W between the first and second disks 12, 14 to maintain a spacing therebetween.

As is illustrated in FIGS. 4 and 6, the animator 10 is pulled through the water, with the water flow parallel to the section of wire W and generally perpendicular to the disks 12, 14. As shown in FIG. 4, the water flow encounters the first disk 12 and is trapped by the forwardly cupped concave surface 28 of the first disk 12. Some of the trapped water escapes through the apertures 20, 22, 24 in the first disk 12 forming water streams which apply forces on the forward convex surface 14A of the second disk 14. Since the apertures 20, 22, 24 in the first disk 12 are not evenly positioned, the forces applied from the water streams are not balanced. Consequently, as illustrated in FIG. 4, the second disk 14 wobbles as the animator 10 is pulled through the water. Further, as the disks 12, 14 are pulled through the water, they rotate about their centers. The apertures 20, 22, 24 and 26, 28, 30 in the disks 12, 14 intermittently come into alignment and the water flows smoothly through the apertures in both disks as is illustrated in FIGS. 6 and 7. However, since the apertures 20, 22, 24 and 26, 28, 30 are not uniformly spaced about the centers of the disks 12, 14, they are unstable and do not remain in the position illustrated in FIGS. 6 and 7 for any considerable length of time. As the apertures diverge from the stable, aligned position, the animator 10 begins to wobble and continues to wobble until the apertures once again come into alignment. Accordingly, as the animator 10 is pulled through the water, it randomly oscillates between the wobbling and stable states thereby causing the attached lure to simulate the movements of a water creature or even a distressed or injured water creature.

FIG. 1 shows a first arrangement in which the animator 10 is connected in a tandem relationship with a lure 38. FIG. 8 shows a second embodiment in which the animator 10 is connected in a parallel relationship with a lure 40.

It is thought that the present invention and its advantages will be understood from the foregoing description and it will be apparent that various changes may be made thereto without departing from the spirit and scope of the invention or sacrificing all of its material advantages, the form herein before described being merely a preferred or exemplary embodiment thereof.

I claim:

1. A device for animating a fishing lure comprising:
   (a) an elongated section of wire;
   (b) at least a pair of disks carried on said section of wire, each of said disks having an arcuate cross-sectional configuration, a mounting hole for slidably receiving said section of wire and a plurality of apertures, said apertures in each of said disks being spaced circumferentially about said mounting hole at unequal distances from each other and spaced radially outwardly from said mounting hole for passing water therethrough as said device is pulled through water; and
   (c) means for retaining said disks on said section of wire.

2. The device of claim 1 wherein each of said disks is rotatably mounted on said section of wire such that said respective apertures of said disks are capable of intermittent alignment which allows the device to rest in a stable mode between random, angular oscillations caused by misalignment said respective apertures of said disks with one another.

3. The device of claim 1 wherein said apertures of each disk are positioned in respective patterns that are alignable only when said disks are oriented in one angular position relative to each other.

4. The device of claim 3 wherein each of said disks is rotatably mounted on said section of wire such that said respective apertures of said disks are capable of intermittent alignment in said one angular position which allows the device to rest in a stable mode between random, angular oscillations caused by misalignment of said respective apertures of said disks with one another.

5. The device of claim 1 wherein said retaining means includes at least a pair of beads attached on said section of wire in a preset spaced relationship from one another with said disks slidably mounted on said section of wire between said beads.

6. The device of claim 5 wherein said retaining means also includes at least one bead disposed on said section of wire between said disks.

7. The device of claim 1 wherein each of said disks has a saucer-shaped configuration.

8. The device of claim 1 wherein each of said disks has a pair of oppositely-facing surfaces of respective concave and convex shapes.

9. The device of claim 8 wherein said disks are disposed on said section of wire in back to back relationship to one another at said respective convex surfaces.

10. A device for animating a fishing lure comprising:
(a) an elongated section of wire;
(b) at least a pair of disks carried on said section of wire, each of said disks having an arcuate cross-sectional configuration, a mounting hole for slidably receiving said section of wire and a plurality of apertures spaced circumferentially from each other and about and radially outwardly from said mounting hole for passing water therethrough as said device is pulled through water, said mounting hole in each of said disks being slightly offset from a center thereof; and
(c) means for retaining said disks on said section of wire.

11. A device for animating a fishing lure comprising:
(a) an elongated section of wire;
(b) a pair of saucer-shaped disks disposed in back to back relation to one another, each of said disks having a center and a mounting hole defined through said disk slightly offset from said center for slidably receiving said section of wire through said mounting hole, each of said disks also having a plurality of corresponding apertures spaced outwardly from said center and arranged in a respective pattern such that corresponding ones of said respective apertures of said discs are aligned with one another in only one angular position of said disks relative to one another; and (c) a plurality of beads having central passages receiving said section of wire therethrough such that said beads are attached thereon so as to limit the maximum spacing of said disks from one another on said section of wire and prevent displacement of said disks off of said section of wire.

12. The device of claim 11 further comprising:
at least one bead disposed on said section of wire between said disks.

13. The device of claim 11 wherein each of said disks has a pair of oppositely-facing surfaces of respective concave and convex shapes.

14. The device of claim 13 wherein said disks are disposed on said section of wire in back to back relationship to one another at said respective convex surfaces.

15. The device of claim 11 wherein each of said disks is rotatably mounted on said section of wire such that said respective apertures of said disks are capable of intermittent alignment in said one angular position which allows the device to rest in a stable mode between random, angular oscillations caused by misalignment of said respective apertures of said disks with one another.

16. A device for animating a fishing lure comprising:
(a) an elongated section of wire; and
(b) at least a pair of disks disposed on said section of wire, each of said disks having a pair of oppositely-facing surfaces of respective concave and convex shapes, said disks being disposed back to back at said respective convex surfaces thereof, each of said disks having a mounting hole for slidably receiving said section of wire and a plurality of apertures, said apertures in each of said disks being spaced circumferentially about said mounting hole at unequal distances from each other and spaced radially outwardly from said mounting hole of said disk; and
(c) means for retaining aid disks on said section of wire so as to prevent said discs from being displaced from one another more than a preset distance along the section of wire.

17. The device of claim 16 wherein said mounting hole is substantially larger in diameter than said section of wire so as to provide a loose-fit mounting relationship of said disks on said section of wire.

18. The device of claim 16 wherein said mounting hole is located slightly offset from said center of said disk.

19. The device of claim 16 wherein said retaining means includes at least a pair of beads mounted on the wire at said preset distance from one another.

20. The device of claim 16 wherein each of said disks is rotatably mounted on said section of wire such that said respective apertures of said disks are capable of intermittent alignment in one angular position which allows the device to rest in a stable mode between random, angular oscillations caused by misalignment of said respective apertures of said disks with one another.

* * * * *